Figure 1:
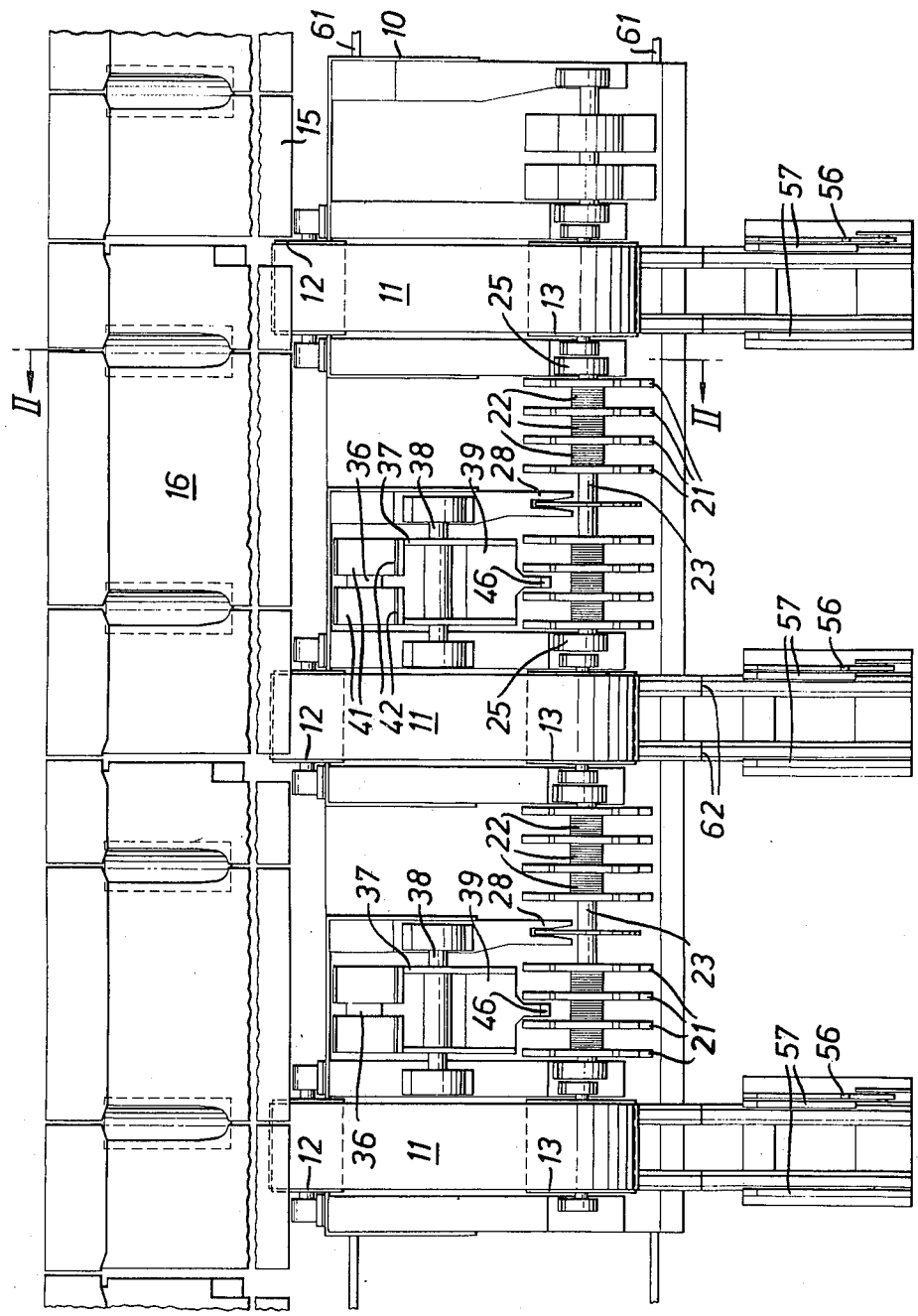

United States Patent [19]
Cleland et al.

[11] 3,920,132
[45] Nov. 18, 1975

[54] MATERIALS HANDLING DEVICE

[75] Inventors: William Pettigrew Cleland, Biggar; William Law Goldie, Glasgow, both of Scotland

[73] Assignee: British Steel Corporation, London, England

[22] Filed: Aug. 8, 1974

[21] Appl. No.: 495,810

Related U.S. Application Data

[63] Continuation of Ser. No. 314,385, Dec. 12, 1972, abandoned.

[30] Foreign Application Priority Data
Dec. 17, 1971 United Kingdom............... 58749/71

[52] U.S. Cl............... 214/6 DS; 198/267; 198/268; 214/1 QG; 214/6 N; 214/6.5
[51] Int. Cl.².................................................. B65G 57/00
[58] Field of Search .......... 214/6 M, 6 N, 6.5, 6 FS, 214/6 DS, 6 H, 1 BV, 1 Q, 1 QG; 198/285, 33 AA, 41, 267, 268

[56] References Cited
UNITED STATES PATENTS
| | | | |
|---|---|---|---|
| 2,559,460 | 7/1951 | Peterson.............................. | 214/6 |
| 3,162,292 | 12/1964 | Lawson............................... | 198/287 |
| 3,670,868 | 6/1972 | Gnage et al........................... | 198/41 |
| 3,727,758 | 4/1973 | Cleland................................ | 198/41 |

FOREIGN PATENTS OR APPLICATIONS
| | | | |
|---|---|---|---|
| 1,290,090 | 2/1969 | Germany.......................... | 214/6 FS |

Primary Examiner—Robert J. Spar
Assistant Examiner—Lawrence J. Oresky
Attorney, Agent, or Firm—Bacon & Thomas

[57] ABSTRACT

A handling apparatus for piling and stacking lengths of ferromagnetic material, for example rolled steel sections, is based on a conveyor running from a loading station at which the sections are loaded crosswise to an unloading station at which they are stripped from the conveyor and piled or stacked. Between the two stations can be magnetic means for inverting selected sections to enable an interlocking pile to be formed. Stripping and piling at the unloading station is accomplished by an electromagnet which accepts each section from the conveyor, rotates to position the section above the pile, and is de-energized to drop the section in position.

11 Claims, 3 Drawing Figures

MATERIALS HANDLING DEVICE

This is a continuation, of application Ser. No. 314,385, filed Dec. 12, 1972, now abandoned.

This invention relates to a materials handling device, in particular to a device for handling lengths of ferromagnetic material such as rolled steel sections and forming them into piles.

In a steel mill producing lengths of steel, for example rolled sections, it becomes necessary to pile and stack the sections so that they can be bundled for dispatch. It may also be necessary to sort the sections into different stacks before bundling so that each bundle will consist for example of sections of the same length, or of sections for one customer.

The term "pile" is used herein to denote a plurality of lengths of material resting one on another, and the term "stack" to denote two or more piles placed side by side.

In accordance with the invention there is provided apparatus for piling lengths of ferromagnetic material, which apparatus comprises a conveyor movable from a loading station to an unloading station, means at the loading station for loading a length of ferromagnetic material crosswise on to the conveyor, a rotatable electromagnet at the unloading station adapted to accept from the conveyor and magnetically hold the length of ferromagnetic material, means for rotating the electromagnet and held ferromagnetic material to an orientation in which the ferromagnetic material is immediately above a receiving surface, and means for deactivating the electromagnet in that orientation to release the length of ferromagnetic material and deposit it on to the receiving surface.

The invention further provides a method of piling lengths of ferromagnetic material, which method comprises loading a length of ferromagnetic material crosswise on to a conveyor at a loading station, moving the length of material on the conveyor to an unloading station, transferring the length of material to an electromagnet and magnetically holding it thereon, rotating the electromagnet and held ferromagnetic material to an orientation in which the ferromagnetic material is immediately above a receiving surface, and deactivating the electromagnet to release the length of ferromagnetic material and deposit it on the receiving surface.

The receiving surface will, except in the first cycle of operations, normally be a length of ferromagnetic material deposited in the preceding cycle. The deposition of successive lengths allows the formation of a pile. Gradual lowering of the base of the pile, for example by the thickness of one length of the ferromagnetic material each time a further length is deposited, may be employed to maintain a receiving surface in substantially the same position at the top of the pile.

As each pile is formed it may be removed and brought together with other piles to form a stack, which can then be bundled in the usual way.

The conveyor preferably comprises an endless belt, and may with advantage comprise two or more parallel endless belts coupled together to move in concert. Such an arrangement facilitates the conveying of particularly long material. Other forms of conveyor may of course also be used.

The loading station may with advantage be situated with good access to a source of the material to be piled, for example near the exit roller table of a steel mill. Rolled steel sections are conventionally delivered lengthwise along such a roller table, and to load them crosswise on to the conveyor without turning them the conveyor may be provided leading at right angles away from the direction of the roller table and a conventional mill type pusher may be provided to push the sections sideways off the roller table to fall or slide crosswise on to the conveyor.

Between the roller table and the conveyor there may be a storage area where lengths of material can be held before passing to the conveyor without interrupting the passage of other material along the roller table. This may be of advantage when the apparatus of the invention is moveable between more than one loading stations and these loading stations correspond to different locations on the same roller table. If the apparatus of the invention can pile the material faster than the material is removed at one location on the roller table, lengths of the material can be removed from several locations on the roller table and held in storage areas corresponding to each location; the apparatus can move between loading stations at each storage area and rapidly pile the accumulated lengths of material from each storage area before moving on to the next.

The apparatus of the invention would normally be moveable parallel to the length of the roller table. More than one such apparatus could be used; for handling and piling exceptional lengths of material two could be coupled together and their operations synchronised to accommodate the material crosswise over their conveyors.

The rotatable electromagnet may with advantage be as described in our co-pending application Ser. No. 57502/71. Such an electromagnet has a core wound with a coil and is provided with means for connecting the coil to a d.c. electrical power source, the core carrying at least two pole pieces extending radially beyond the wound core and provided with edge profiling adapted to receive a length of ferromagnetic material bridging the pole pieces, the electromagnet being mounted for axial rotation about the core on bearings in a frame.

The apparatus of the invention may also include means for inverting selected lengths of ferromagnetic material with respect to other lengths of the material. Some rolled steel sections, for example channel sections, require to be piled with every alternate section inverted to give a compact and stable pile.

Figure 2:
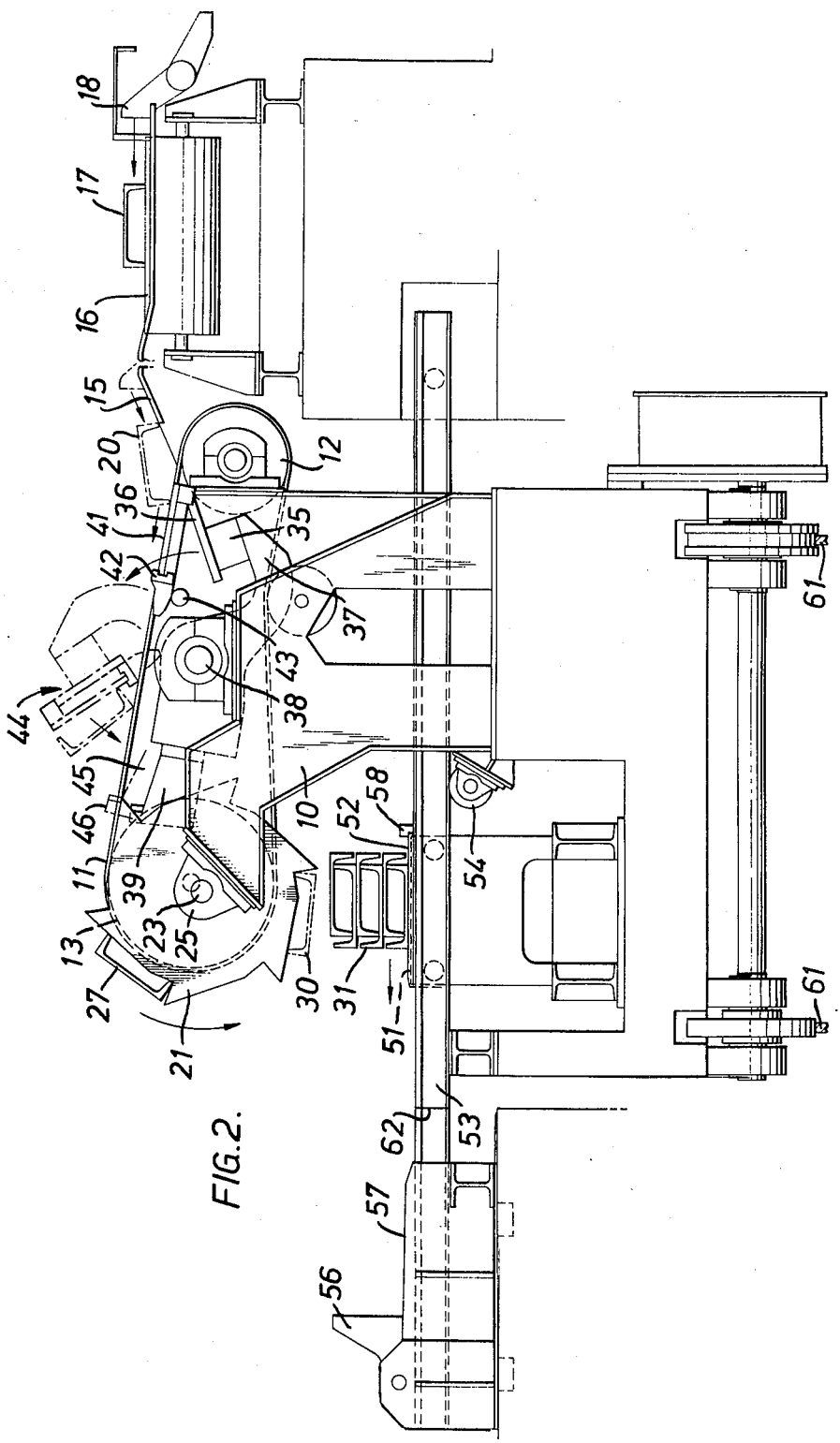
Figure 3:
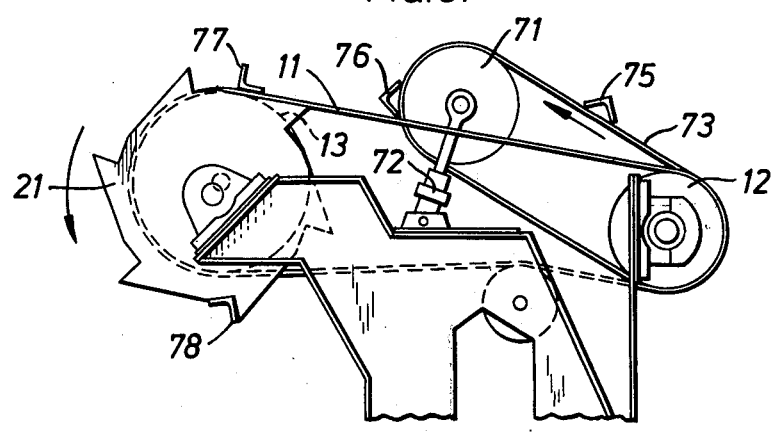

The invention is illustrated by way of example in the accompanying drawings, in which FIG. 1 is a plan view of the handling device;

FIG. 2 is a cross section of the device shown in FIG. 1 taken along the line II—II and FIG. 3 shows in a similar view to FIG. 2 a modification of the handling device.

A frame 10 carries the principal components of the apparatus, including three parallel synchronised endless conveyor belts 11 passing around pulleys 12 and 13. The pulleys 12 are adjacent the lower end of a slide 15 leading down from a roller table 16 on to which rolled steel sections, one being shown chain dotted at 17 in FIG. 2, can be delivered.

As shown in FIG. 2, a pusher 18 can be operated to push the section at 17 sideways off the roller table and down the slide on to the belts at 20. The section can then be carried by the belts towards the further pulley 13.

Between the three pulleys 13 are arranged two electromagnets having generally annular pole pieces 21 and being wound with coils 22 (FIG. 1) about the cores 23. The electromagnets are rotatable through 360° about their cores, which are carried in bearings 25 on the frame 10. The cores 23 are parallel with but offset from the axis of rotation of the pulleys 13; and the edges of the pole pieces 21 are a greater distance from the cores than the radius of the pulleys 13. It is thus possible to arrange the electromagnets with respect to the pulleys 13 such that, in a side view as shown in FIG. 2, the pulleys run entirely within the area of the pole pieces except where their edges are tangential where the belts run on to the pulleys.

As a section is carried on the belts 11 it reaches the pulleys 13 and is then smoothly transferred on to the pole pieces 21, where it is held magnetically. It continues to be urged sideways by the moving belt, rotating the electro-magnets, until its centre of gravity passes over the core 23, when its weight and momentum start the electromagnets spinning, as shown by the section at 27 in FIG. 2.

The cores 23 are provided with disc brakes 28 as shown in FIG. 1. These slow the otherwise free rotation of the electromagnets until they reach rest with the section below their axis of rotation, as shown chain dotted at 30 in FIG. 2. The electromagnets are then deactivated by conventional means releasing the section at 30 to drop a short distance to the top of the partially formed pile 31 below the electromagnets.

The sections illustrated are channel sections which are piled with alternate sections inverted. The apparatus includes means for carrying out the necessary inversion operation including magnets 35 having faceplates 36 and carried on arms 37 pivoted at 38. The arms 37 are balanced by counterweights 39, and the whole inversion assembly is motor driven.

Two inversion assemblies are shown lying below the path of a section travelling on the belts 11. Their operations are synchronised, and will be described primarily with reference to FIG. 2.

The faceplates 36 carry hinged to their upstream ends further plates 41, whose downstream ends carry raised stops 42 and rest on pins 43 in an attitude such that the plates 41 are parallel with the belts 11 and the stops project above the surface of the belts. A section travelling on the belts is stopped and aligned by the stops 42. The arms 37 are then driven upwards about their pivots 38 causing the magnets 35 and their faceplates to flatten against the underside of the plates 41 and then lift these plates with the carried section away from the belts.

The rotary movement continues to the position shown chain dotted at 44 where the weight of the section pulls it free from the grip of the magnets 35 and it drops inverted back onto the belts. The inversion assemblies are then driven back to their starting positions, retracting the stops 46 below the belts and allowing the section to proceed towards the pulleys 13.

It should be noted that the stops 46 can also be used to align uninverted sections in a similar manner.

If a section does not require to be inverted the stops 42 can be retracted below the level of the belts by lowering the arms 37 and thereby sliding the plates 41 along and around the pins 43.

The pile of sections formed at 31 is carried on tables 51 below each pulley 13 which can be raised and lowered hydraulically. The tables are initially raised and are lowered a controlled distance as each section is deposited on the pile to maintain a short distance between the pole pieces 21 and the receiving surfaces for the released sections. When the tables have been lowered to the height shown in FIG. 2 the pile can be removed by trolleys 52 running in rails 53. The trolleys, driven by rack and pinion 54, can be run out until the sections reach end stops 56. Ramps 57 are provided near the end stops to raise the pile of sections from the trolleys, which can however continue to move the pile forward over the ramp by virtue of their raised rearward edges 58. The trolleys can then be reversed from under the pile of sections and run back to their starting positions.

Subsequent piles can be run up in the same way against piles already on the ramps 57 to form a stack of sections.

The whole piling apparatus is carried on rails 61 running parallel with the roller table 16. The rails 53 in which the trolleys 52 run are cut at 62 to allow the piling apparatus to travel along the rails 61 beside the roller table. Further, the area between roller table 16 and the slide 15 is shown cut away, but this area may be wide enough to form a storage area between the roller table and the movable piling apparatus for a number of sections to lie side by side. All these features taken together allow the apparatus to move between several storage areas along the length of the roller table, forming separate piles and stacks from the sections at each storage area. The use of several storage areas allows an initial sorting operation to be performed on the sections before they are piled, and allows steady accumulation of sections at each storage area while the piling apparatus rapidly piles the sections from any one storage area before moving on to another.

The handling device partially shown in FIG. 3 is identical to that shown in FIGS. 1 and 2 except in its provision for inverting selected lengths of ferromagnetic material. Additional coaxial pulleys 71 are carried on parallel hydraulic rams 72 between the pulleys 12 and 13. The pulleys 71 are electromagnetic, and each is suitably formed from an electromagnet rotatable about its core as axis and having disc-like pole pieces to be utilised as the opposite circular sides of the pulley. Belts 73 are carried between the pulleys 71 and 12 and are driven by the pulleys 12 at the same speed and in the same direction as belts 11.

When the rams 72 are retracted the top run of the belts 73 and the pulleys 71 lie level with or below the top run of the belts 11, leaving no obstacle to the passage of sections over the belts 11. When the rams 72 are extended to the position illustrated, the sections travel up the belts 73 as shown at 75 and around the magnetic pulleys 71 to the position 76 at which point the electromagnets in the pulleys 71 is briefly de-energised. This permits the section to transfer in an inverted orientation to the belts 11, and it then travels as previously described with reference to FIGS. 1 and 2 through the positions 77 and 78 where it is released from the handling device.

By using the inversion procedure illustrated in FIG. 3 a rapid throughput can be obtained, since the rams 72 can be operated on a selective basis without disrupting the passage of any sections not to be inverted. Thus, from the position illustrated in FIG. 3, the rams can be retracted to transfer the section shown at 75 back on to belts 11 before it reaches the pulleys 71.

It should be noted that although the rotatable electromagnets formed by the cores 23 and pole pieces 21 have been described as moving by gravity when carrying a section, they can alternatively be motor driven.

We claim:

1. A plurality of endless conveyors for transferring lengths of ferromagnetic material from a loading station to an unloading station, each of the plurality of endless conveyors travelling around pulleys having a first common axis of rotation at the unloading station,
   means at the loading station for loading successive lengths of ferromagnetic material crosswise to the path of travel of said plurality of endless conveyors,
   a plurality of activatable electromagnetic wheels each being mounted for rotation through 360° about a second common axis and spaced in between said plurality of endless conveyors, each one of said wheels comprising a core carrying at least two generally annular pole pieces extending radially beyond the core and provided with a plurality of edge notches corresponding to the receiving position of each one of a succession of said lengths of ferromagnetic material.
   said first common axis being spaced from said second common axis such that the path of travel of the endless conveyors towards the unloading station intersects the path of travel of the electromagnetic wheels,
   WHEREBY, each one of the lengths of ferromagnetic material is transferred from the endless conveyors to the electromagnetic wheels and held by the electromagnetic wheels until upon rotation through half a turn and subsequent deactivation of the electromagnetic wheels, lengths of ferromagnetic material are successively deposited onto a receiving surface which lies below the electromagnetic wheels.

2. Apparatus as claimed in claim 1 further comprising a receiving surface at the unloading station disposed below the electromagnetic wheels; and means for maintaining the receiving surface at a predetermined position relative to the said rotatable electromagnetic wheels in response to the height of a pile of lengths of ferromagnetic material released from the electromagnet.

3. Apparatus as claimed in claim 1 further comprising a receiving surface at the unloading station disposed below the electromagnetic wheels; and means for laterally displacing the receiving surface to accumulate as a stack the lengths of ferromagnetic material received from the said rotatable electromagnetic wheels.

4. A plurality of endless conveyors for transferring lengths of ferro-magnetic material from a loading station to an unloading station, each of the plurality of endless conveyors travelling around pulleys having a first common axis of rotation at the unloading station,
   means at the loading station for loading successive lengths of ferromagnetic material crosswise to the path of travel of said plurality of endless conveyors,
   a plurality of activatable electromagnetic wheels each being mounted for rotation through 360° about a second common axis and spaced in between said plurality of endless conveyors, each one of said wheels comprising a core carrying at least two generally annular pole pieces extending radially beyond the core and provided with a plurality of edge notches corresponding to the receiving position of each one of a succession of said lengths of ferromagnetic material,
   said first common axis being spaced from said second common axis such that the path of travel of the upper runs of the endless conveyors lies tangential to the path of travel of the electromagnetic wheels and said endless conveyors then having a path of travel around said pulleys which lies within the path of travel of the electromagnetic wheels,
   WHEREBY, each one of the lengths of ferromagnetic material is transferred from the endless conveyors to the electromagnetic wheels and held by the electromagnetic wheels until upon rotation through half a turn and subsequent deactivation of the electromagnetic wheels, lengths of ferromagnetic material are successively deposited onto a receiving surface which lies below the electromagnetic wheels.

5. A plurality of endless conveyors for transferring lengths of ferromagnetic material from a loading station to an unloading station, each of the plurality of endless conveyors travelling around pulleys having a first common axis of rotation at the unloading station,
   means at the loading station for loading successive lengths of ferromagnetic material crosswise to the path of travel of said plurality of endless conveyors,
   means between the loading station and the unloading station for inverting selected lengths of ferromagnetic material with respect to other lengths of the material,
   a plurality of activatable electromagnetic wheels at the unloading station each being mounted for rotation through 360° about a second common axis and spaced in between said plurality of endless conveyors, each one of said wheels comprising a core carrying at least two generally annular pole pieces extending radially beyond the core and provided with a plurality of edge notches corresponding to the receiving position of each one of a succession of said lengths of ferromagnetic material,
   said first common axis being spaced from said second common axis such that the path of travel of the endless conveyors towards the unloading station intersects the path of travel of the edges of the electromagnetic wheels
   WHEREBY, each one of the lengths of ferromagnetic material is transferred from the endless conveyors to the electromagnetic wheels and held by the electromagnetic wheels until upon rotation through half a turn and subsequent deactivation of the electromagnetic wheels, lengths of ferromagnetic material are successively deposited onto a receiving surface which lies below the electromagnetic wheels.

6. Apparatus as claimed in claim 5, wherein the means for inverting selected lengths comprises a magnet movable between ambush and operative positions, means for engaging a selected length with the magnet in the operative position, and means for rotating a magnet to invert the selected length.

7. Apparatus as claimed in claim 6 wherein the said magnet is integral with a pulley drum, and the means for engaging a selected length with the magnet and the means for rotating the magnet comprise an endless belt drivable between the loading station and the pulley drum.

8. Apparatus as claimed in claim 4 further comprising a receiving surface at the unloading station disposed below the electromagnetic wheels; and means for maintaining the receiving surface at a predetermined position relative to the said rotatable electromagnetic wheels in response to the height of a pile of lengths of ferromagnetic material released from the electromagnet.

9. Apparatus as claimed in claim 4 further comprising a receiving surface at the unloading station disposed below the electromagnetic wheels; and means for laterally displacing the receiving surface to accumulate as a stack the lengths of ferromagnetic material received from the said rotatable electromagnetic wheels.

10. Apparatus as claimed in claim 5 further comprising a receiving surface at the unloading station disposed below the electromagnetic wheels; and means for maintaining the receiving surface at a predetermined position relative to the said rotatable electromagnetic wheels in response to the height of a pile of lengths of ferromagnetic material released from the electromagnet.

11. Apparatus as claimed in claim 5 further comprising a receiving surface at the unloading station disposed below the electromagnetic wheels; and means for laterally displacing the receiving surface to accumulate as a stack the lengths of ferromagnetic material received from the said rotatable electromagnetic wheels.

* * * * *

UNITED STATES PATENT OFFICE
CERTIFICATE OF CORRECTION

Patent No. 3,920,132            Dated November 18, 1975

Inventor(s) CLELAND, ET AL

It is certified that error appears in the above-identified patent and that said Letters Patent are hereby corrected as shown below:

The name of the Assignee should read: BRITISH STEEL CORPORATION and LAMBERTON AND COMPANY LIMITED.

Signed and Sealed this sixteenth Day of March 1976

[SEAL]

Attest:

RUTH C. MASON
*Attesting Officer*

C. MARSHALL DANN
*Commissioner of Patents and Trademarks*